Patented Feb. 24, 1948

2,436,733

UNITED STATES PATENT OFFICE 2,436,733

ZINC OXIDE-BISMUTH OXIDE CATALYST

Helmuth G. Schneider, Westfield, and Vincent F. Mistretta, Fanwood, N. J., assignors, by mesne assignments, to Standard Oil Development Company, a corporation of Delaware No Drawing. Application December 28, 1944, Serial No. 570,210

3 Claims. (Cl. 252—206)

The present invention relates to improved catalysts and more particularly to improved catalysts useful for instance in the conversion of secondary alcohols to ketones.

It is well known that the dehydrogenation of secondary alcohols to the corresponding ketones may be achieved by passing the alcohols at elevated temperatures over substances acting as dehydrogenation catalysts. In the early stages of development in this field, metals such as copper, brass, etc. were employed in this type of reaction. These catalysts possess the disadvantages of high operating temperatures and short life. Somewhat later, difficultly reducible oxides such as zinc oxide, cerium oxide, magnesium oxide, etc., attained considerable prominence as dehydrogenation catalysts. Various combinations of catalytic metals and difficultly reducible oxides have also been employed from time to time. It was found that difficultly reducible oxides have a dehydrating as well as a dehydrogenating effect and that due to the dehydrating effect, considerable olefin was regenerated from the alcohol which reduced the overall yield of ketone. In an attempt to minimize these reactions, additives such as the alkali or alkaline earth metal carbonates or hydroxides have been employed in conjunction with the difficultly reducible oxide catalysts. In instances where these additives have been used it has been noted that they make the catalyst thermally less stable, thus reducing its life and increase the susceptibility of the catalyst to catalyst poisons.

The object of the present invention is to increase the activity of difficultly reducible oxide catalysts as dehydrogenation catalysts, particularly for the dehydrogenation of compounds containing the organic grouping

R—CHOH—R(R₁)

Another object is to improve the stability of dehydrogenation catalysts at high temperatures. Still another object is to make difficultly reducible oxide catalysts more resistant to catalyst poisons thus lengthening the active life of the catalysts. These and other objects will be apparent to those skilled in the art upon reading the following description.

These objects are accomplished by the following invention, which in its general aspect, comprises the employment of bismuth oxide in conjunction with difficultly reducible oxide dehydrogenation catalysts of which zinc oxide, cerium oxide and magnesium oxide are examples. It has now been found that from 1% to 6% of bismuth oxide, $Bi_2O_3$, based upon the weight of difficultly reducible oxide used, preferably about 6%, greatly improves the action of the difficultly reducible oxide as a dehydrogenation catalyst in reactions involving compounds having the formula

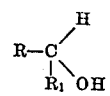

where R may be an alkyl, aryl, alkaryl, aralkyl or cyclo alkyl radical and $R_1$ can be H, or an alkyl, aryl, aralkyl, alkaryl or cycloalkyl radical such as methyl, ethyl, propyl, etc.; phenyl; benzyl, etc.; methyl, phenyl or cyclohexyl. The improvement obtained by using less than 1% of bismuth oxide is perceptible, but not sufficient to be of any material consequence, while the improvement engendered by the use of more than 6% of bismuth oxide is not sufficient over that obtained when using about 6% to warrant the additional expenditure.

Taking the preparation of $ZnO$-$Bi_2O_3$ catalyst as typical of the composition of this invention, it is preferred practice to mix the two oxides in the proper proportions in powdered form, then work in enough water to make a heavy slurry of the oxides, the slurry to be about the consistency of heavy cream. This will ordinarily require a volume of water approximately equivalent to the volume of powder used. The catalyst slurry is then coated on a carrier. This is conveniently accomplished by putting the catalyst support or carrier in a tumbling mechanism, pouring the catalyst slurry over the carrier and then tumbling until a uniform mix is secured. The mix is then placed in an oven at 80° C. and dried. The drying step generally requires from 24 to 48 hours. Pumice in granular or pill form or metal turnings such as those formed from copper or brass are the preferred carrier or catalyst support although other types of carriers are known to the art and perform equally well.

The catalysts of the present invention are particularly efficacious in the dehydrogenation of secondary alcohols such as isopropyl alcohol, secondary butyl alcohol, secondary amyl alcohol and homologues thereof to the corresponding ketones. The conversion of secondary alcohols to ketones is accomplished by passing the alcohol in vapor form through a catalyst packed tube heated to the temperature from 350° to 500° C. at a pressure of from about 1–3 atmospheres and a feed or feed rate of from 0.5 to 10 volumes of liquid alcohol per volume of catalyst per hour. The vapors are then passed to a condenser where the ketone and unreacted alcohol are condensed from the less readily condensible gases consisting predominantly of hydrogen and a small amount of, ordinarily not more than 1%, of regenerated olefin.

Having outlined the general principles of the invention, the following examples which are included merely for purposes of illustration and not as a limitation, of the conversion of secondary butyl alcohol to methyl ethyl ketone run under the conditions indicated in each example graphically demonstrate the superiority of the present catalyst with respect to activity at high throughput, optimum temperature of reaction, thermal stability, longer life and resistance to poisons:

CATALYST ACTIVITY

The increased activity of ZnO catalyst fortified with $Bi_2O_3$ is clearly demonstrated in Example 1 below, which shows that $ZnO-Bi_2O_3$ at high feed rates maintains a conversion at a 90% level whereas ZnO alone and $ZnO+Na_2CO_3$ catalysts drop to 70%. Example 2 similarly shows the improved catalytic activity of $ZnO-Bi_2O_3$ catalyst with gradual increased feed rates.

Example 1

[Temp. 400° C.—2#/sq. in. gauge]

| Catalyst (on pumice) | ZnO | ZnO+6% $Na_2CO_3$ | ZnO+6% $Bi_2O_3$ |
|---|---|---|---|
| Per cent conversion to ketone at— | | | |
| 1.5 vol. alc./vol. cat./Hr | 93.0 | 91.0 | 92.0 |
| 6.0 vol. alc./vol. cat./Hr | 70.0 | 70.0 | 90.0 |

Example 2

[Temp. 400° C.—2#/sq. in. gauge]

| Catalyst (on brass) | ZnO+6% $Na_2CO_3$ | ZnO+6% $Bi_2O_3$ |
|---|---|---|
| Per cent conversion to ketone at— | | |
| 1.5 v./v./Hr | 91.0 | 98.0 |
| 3.0 v./v./Hr | 85.0 | 97.0 |
| 4.5 v./v./Hr | 77.0 | 95.0 |
| 6.0 v./v./Hr | 70.0 | 92.0 |

The increased activity of $ZnO-Bi_2O_3$ is further revealed in Example 3 below which shows that for a given conversion of alcohol to ketone the $Bi_2O_3$ fortified catalyst permits a lower operating temperature. This holds true at normal and higher than normal feed rates.

Example 3

[Feed rate 1.5 v./v./hr.—2#/sq. in. gauge]

| Catalyst (on brass) | ZnO+6% $Na_2CO_3$ | ZnO+6% $Bi_2O_3$ |
|---|---|---|
| Per cent conversion to ketone at— | | |
| 350° C | 50.0 | 57.9 |
| 375° C | 68.0 | 90.0 |
| 400° C | 91.0 | 98.0 |

[Feed rate 6.0 v./v./hr.—2#/sq. in. gauge]

| Catalyst (on brass) | ZnO+6% $Na_2CO_3$ | ZnO+6% $Bi_2O_3$ |
|---|---|---|
| Per cent conversion to ketone at— | | |
| 350° C | 29.0 | 31.0 |
| 375° C | 43.0 | 62.0 |
| 400° C | 70.0 | 92.0 |

THERMAL STABILITY

Example 4

The $ZnO-Bi_2O_3$ catalyst can withstand extreme variations in temperature without appreciably decreasing alcohol conversion to ketone. The thermal stability of a catalyst is closely related to catalyst life and is important from a commercial point of view in that temperature fluctuations and shutdowns will not be of serious consequences when a $ZnO-Bi_2O_3$ catalyst is employed.

In order to test the thermal stability of the catalysts tests were run for a period of 5 hrs. each at 400° C., 500° C. and then returned to 400° C., using a 1.5 v./v./hr. feed rate at 2#/sq. in. gauge.

| Catalyst (on brass) | ZnO | ZnO+6% $Na_2CO_3$ | ZnO+6% $Bi_2O_3$ |
|---|---|---|---|
| Per cent Conversion to ketone at— | | | |
| 400° C | 92.0 | 92.0 | 98.0 |
| 500° C | 98.0 | 67.0 | 97.1 |
| 400° C | 78.0 | 53.0 | 90.0 |

| Catalyst (on pumice) | ZnO | ZnO+6% $Na_2CO_3$ | ZnO+6% $Bi_2O_3$ |
|---|---|---|---|
| Per cent Conversion to ketone at— | | | |
| 400° C | 93.0 | 91.0 | 92.0 |
| 500° C | 95.0 | 90.0 | 98.0 |
| 400° C | 64.0 | 72.0 | 82.0 |

CATALYST LIFE

The $ZnO-Bi_2O_3$ catalyst possesses a longer active life than other conventional catalysts. This is shown by an accelerated life test, run simultaneously in the same heating bath with the same alcohol feed. This accelerated test was performed to demonstrate, under adverse conditions for the $ZnO-Bi_2O_3$, that a longer active life is characteristic of the $Bi_2O_3$ fortified catalyst. The $ZnO-Na_2CO_3$ catalyst at increased feed rate converts only 70% of the alcohol charged to ketone whereas $ZnO-Bi_2O_3$ catalyst must maintain a 90% conversion. Any decrease in activity, therefore, would be much more noticeable with the $ZnO-Bi_2O_3$ catalyst. The results are illustrated in Example 5 below, which clearly shows the longevity of the $ZnO-Bi_2O_3$ catalyst.

Example 5

[Temp. 400° C.—2#/sq. in. gauge—6 v./v./hr. feed rate]

| Days on Stream | ZnO+6% $Na_2CO_3$ per cent M. E. K. | ZnO+6% $Bi_2O_3$ per cent M. E. K. |
|---|---|---|
| 4 | 70.0 | 92.0 |
| 8 | 68.0 | 91.0 |
| 12 | 68.0 | 91.0 |
| 16 | 68.0 | 91.0 |
| 20 | 68.0 | 91.0 |
| 24 | 66.0 | 91.0 |
| 28 | 61.0 | 91.0 |
| 32 | 57.0 | 91.0 |
| 36 | 51.0 | 89.0 |
| 40 | 43.0 | 86.0 |
| 44 | 43.0 | 86.0 |
| 48 | 34.0 | 86.0 |

RESISTANCE TO IMPURITIES IN FEED STOCK

For a given alcohol quality a difficultly reducible oxide dehydrogenation catalyst containing $Bi_2O_3$ exhibits a marked resistance to poisons. The secondary butyl alcohol used for illustrative purposes had the following compositions.

|  | Per cent |
|---|---|
| Alcohol (by weight) | 92.4 |
| $H_2O$ (by weight) | 0.3 |
| Impurities | 7.3 |
|  | 100.0 |

Example 6

[Temp. 400° C.—2#/sq. in. gauge, feed rate=1.5 v./v./hr.]

| Catalyst | Per cent conversion to M. E. K. |
|---|---|
| ZnO+6% Na₂CO₃ | 86.0 |
| ZnO+6% Bi₂O₃ | 95.0 |

What is claimed is:
1. As a composition of matter a dehydrogenation catalyst consisting of a mixture of zinc oxide and 1–6% $Bi_2O_3$.
2. As a composition of matter a dehydrogenation catalyst consisting of a mixture of zinc oxide and 1–6% bismuth oxide, based on the weight of zinc oxide, deposited on a carrier.
3. As a composition of matter a dehydrogenation catalyst consisting of a mixture of zinc oxide and 6% bismuth oxide, based on the weight of zinc oxide, deposited on a carrier.

HELMUTH G. SCHNEIDER.
VINCENT F. MISTRETTA.

REFERENCES CITED

The following references are of record in the file of this patent:

UNITED STATES PATENTS

| Number | Name | Date |
|---|---|---|
| 1,577,189 | Patrick | Mar. 16, 1926 |
| 1,895,528 | Taylor | Jan. 31, 1933 |
| 1,204,141 | Ellis | Nov. 7, 1916 |
| 1,211,394 | Bosch et al. | Jan. 9, 1917 |
| 1,746,781 | Lazier | Feb. 11, 1930 |
| 2,370,797 | Kearby | Mar. 6, 1945 |